Figure 1:
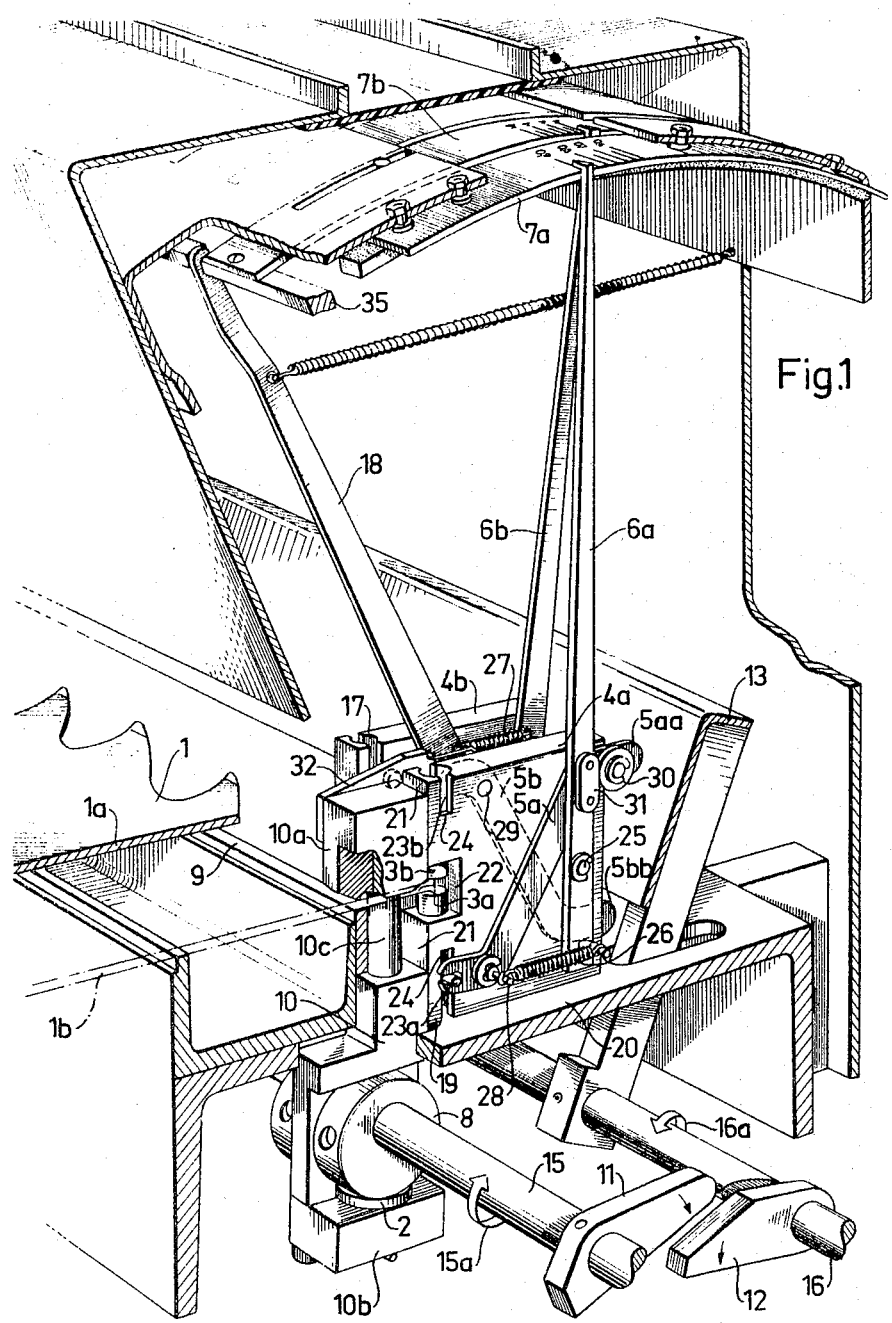

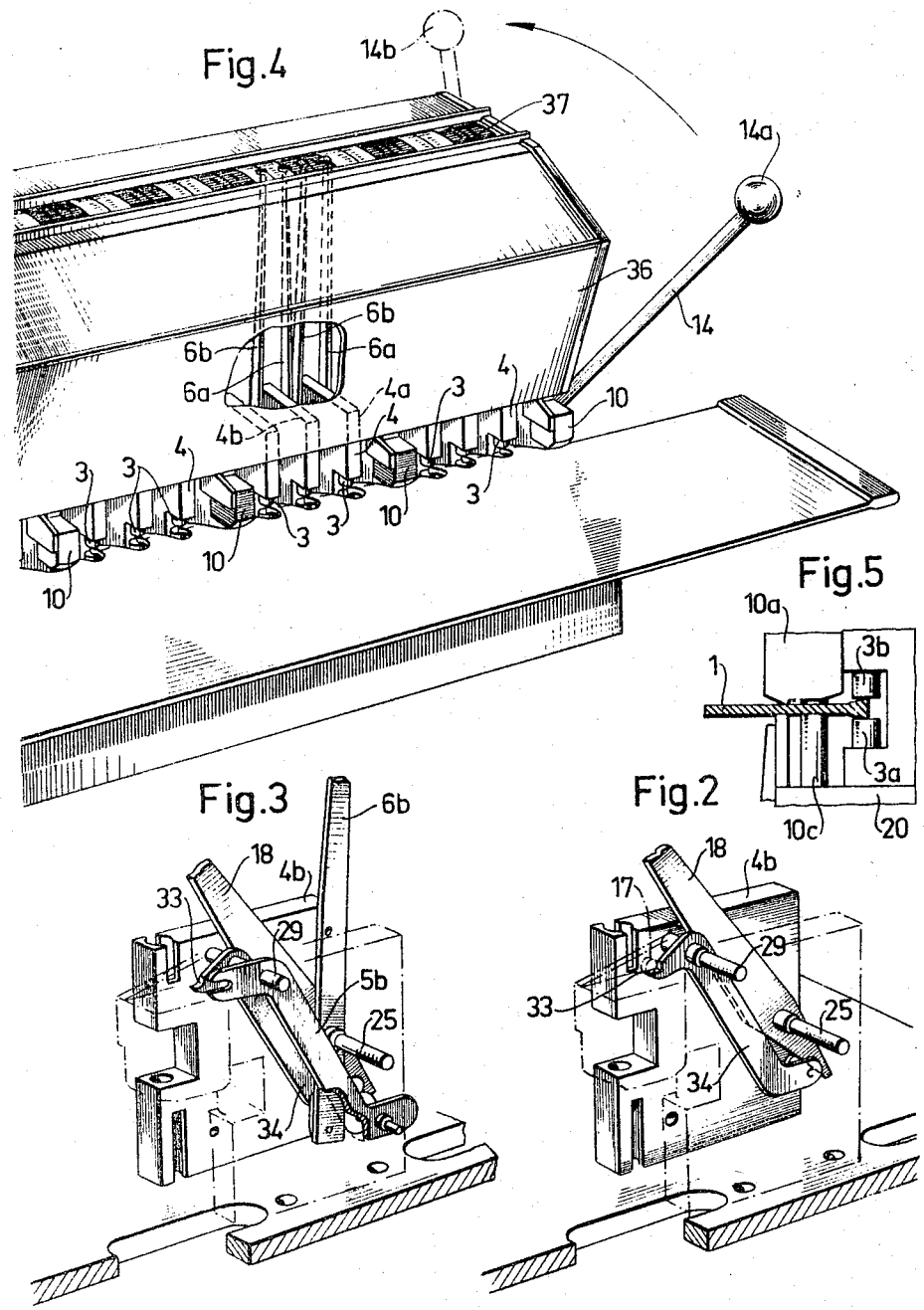

United States Patent Office 3,305,934
Patented Feb. 28, 1967

3,305,934
MEASURING DEVICE FOR SAW TEETH
Tord Eric Pettersson, Solna, Sweden, assignor to Berthen AG, Basel, Switzerland, a joint-stock company of Switzerland
Filed Nov. 16, 1964, Ser. No. 411,464
Claims priority, application Sweden, Nov. 22, 1963, 12,931/63
10 Claims. (Cl. 33—202)

The invention relates to a measuring device, especially intended for measuring the kerf-widths of the teeth of band-saw-blades and frame-saw-blades or the sets, i.e. the amounts to which the side edges of the set tooth project beyond the respective side of the body of the saw-blade, of said band- and frame-saw-blades and also the position of the saw teeth in relation to the side of the saw-blade (or to set the setting degree of said saw teeth).

Known measuring devices are constituted by a vernier caliper or the like for measuring the thickness of the tooth or the kerf-width of its projecting portion and a so called clock gauge for measuring or checking the position of the tooth-point in relation to the side of the saw-blade. The use of these measuring devices is very time consuming and means that every tooth must be gauged manually, firstly with the vernier caliper and secondly with the clock gauge, the latter on both sides of the teeth. This thus involves three work-steps for each tooth, one made with the vernier caliper and two with the clock gauge. Upon correcting a possibly wrongly set or wrongly positioned tooth the clock gauge must be removed, the tooth corrected and then re-gauged. If the correction made is not satisfactory a further correction must be made and a new gauging undertaken. It may sometimes be necessary to repeat the process several times for the same tooth.

Thus inconveniences exist with these known devices since their manner of use is time consuming and that no effective control of the lateral position of the adjusted tooth in relation to the remaining teeth is obtained. On the other hand it is realized that both from the point of view of quality of the produced wood in question and from the point of view of production it is particularly important to carefully attend to the saw-blade by undertaking regular grinding, setting and correction of the saw-blade teeth. Great demand is placed upon the saw operators who, in order to align the teeth of a saw-blade, must write down the angle of each tooth as measured by the clock gauge and thereupon adjust, possibly extend, the teeth and who thereafter again must alternately take measurements and make adjustment until such time as a satisfactorily result has been achieved.

Setting machines are certainly known in which the number of set teeth of the saw-blade corresponds to a number of setting levers which are pivotally arranged on a parallel shaft having a clamping arrangement for the saw-blade whereby the bearing arrangements of the clamping levers are manufactured in the form of circular plates which are provided with a recess at their periphery intended to come into engagement with a tooth on the saw-blade corresponding to said recess. To every other such setting plate the left or right edge alternately of the recess is inclined in such a way that upon extending each alternate setting lever in one direction and the other lever in the opposite direction an alternate setting of the saw teeth to the right and left is obtained. In order to obtain the same degree of extension on all teeth the ends of the setting lever arms facing away from the saw-blade are pointed so that they are capable of being aligned, in the bent out position, to one or the other of two alignment lines arranged above the clamping arrangement for the saw-blade and parallel to said saw-blade.

Although the setting of a new saw is facilitated by such an arrangement it is, however, not satisfactory for saws that have already been used where the blade has become worn and consequently is of unequal thickness and therefore is inclined to go with the saw teeth in an adjusting-setting operation. Moreover the arrangement is not usable for saws having swage-set teeth either and above all it does not give any exact reading of a setting degree of a saw tooth.

The present invention is intended to avoid the inconveniences, mentioned above, in known measuring and adjusting arrangements for saw-blades and mainly consists in that the measuring arrangement includes a measuring plane forming a support for the saw-blade, and at least one clamping arrangement for pressing the saw-blade against said support, and at least one measuring member, securely attached to the support, consisting of two sensing devices one on either side of the measured saw tooth capable of being moved towards and away from it and intended for gauging the above mentioned distance, the set, and a transmitting means for enhanced transmission of the movement of said sensing members to a reading means including at least one scale securely connected to a support.

According to a further development of the invention the sensing members are constituted by suitable linear measuring pins movable in a measuring frame and the transmission means by link-systems movably arranged in said frame with each actuating an indicator. The indicators could thereby be connected to the measuring pins by means of S-shaped links embodied close to the mounting shaft of said indicators. Indicators as well as link-systems, which are allotted to individual measuring pins, are thereby mounted on each side of the measuring frame in such a way that the thickness of the measuring device corresponds mainly to the pitch of the saw.

It is suitable to, according to the invention, construct the clamping device as a reading device for the thickness of the saw-blade at the clamping position and to transmit the result to the reading scale of the upper tooth-point sensing member for adjusting its reference position. The clamping device is thereby allotted a measuring member including a sensing member, a measuring frame and a link-system as well as indicators. It is also displaceably arranged in relation to said measuring member and provided with a transmission means which, at least close to the clamped position of the clamping device, transmits to the reading arrangement a displacement of the clamping device in relation to the measuring member, on which is indicated the amount of set or side-projection of the saw tooth in relation to the upper side-surface of the saw-blade. It is also suitable that a locking-head, or locking jam or the like on clamping device, which is displaceable in relation to the measuring frame be connected to a lever mounted on said measuring frame which carries a reading scale for the indicators. Displacement of the locking head can thereby be effected by means of an eccentric disc arranged on a clamping shaft common to a plurality of clamping devices. In order to ensure a positive connection between the locking head and the eccentric disc a spring actuated slide member is arranged between both said members. The clamping shaft is arranged to be rotated by an operating lever handle.

A special stop-member can be arranged, according to a further development of the invention, for releasing the sensing means, which upon release of the saw-blade, for example by means of transmitting movement energy from the clamping shaft to an operation shaft, causes a bar member or the like to strike against the link-member of the sensing means.

The measuring device, according to the invention, also has the advantage that it can be compactly constructed in the lateral direction so that in the longitudinal direction of the saw-blade it does not require more space than that corresponding to the pitch, i.e. for spring-set teeth not more than e.g. approx. 17 mm. and for swage-set teeth approx. 25 mm. In this way it is possible, according to the invention, to combine a number of measuring devices corresponding to the number of teeth in the saw-blades to be located to a measuring apparatus which gives a reading of the value of all the saw teeth simultaneously.

The invention will now be described more in detail in connection with the attached drawings in which the figures show the following:

FIG. 1 a measuring arrangement according to the invention provided with a clamping device.

FIGS. 2 and 3 details in a link system of a measuring frame.

FIG. 4 a measuring apparatus, according to the invention built up of several measuring devices and FIG. 5 a detailed diagram of FIG. 1 in which the abutment of the measuring pins against the side edges of a swage-set tooth is evident.

In FIG. 1, in cutaway section, is shown a perspective view of a measuring device according to the invention. The saw-blade, the teeth of which are to be measured, is indicated by 1 and is placed on a support 9 having the shape of a U-beam whose edges thus form a measuring plane for the saw blade. A clamping device 10 has an upper rectangular part in the form of a clamping head or a clamping jam 10a and a lower slide shaped part 10b having a cooperating eccentric disc 8. The upper and lower parts are combined together by means of a cylindrical bar 10c. The eccentric disc 8 is secured to a clamping shaft which, by means of an operating lever 14, shown in FIG. 4, can be rotated in the direction opposite to that indicated by the arrow 15a to cause clamping of the saw-blade and in the direction indicated by the arrow 15a for releasing the saw-blade. Thereby upon the obtained rotationed rotation movement of the eccentric disc 8 a displacement upwards and downwards is obtained by the clamping device 10.

In FIG. 1 the saw-blade 1 has been cut away along the line 1a but the extension of the blade in under the clamping head 10a is evident from the broken, dotted lines 1b. Upon clamping the saw the slide shaped part 10b is moved downwards by the eccentric disc and the clamping head 10a, as is more evident from FIG. 5, is pressed against the upper side of the saw-blade body by means of a point in the jam of the head. A sliding member 2, retained under spring pressure, is arranged in the slide shaped part of the clamping device between the eccentric disc 8 and the clamping part 10b. Thereby an elastic clamping and a positive retention of the saw-blade is obtained so that saw-blades having different thicknesses can be passed into the measuring device without re-adjustment to said measuring device and so that saw-blades which also, because of wear and elongation, have an uneven thickness can be treated. The clamping device, upon being moved, slides up and down in a guide 19 in a base-plate 20 on which the complete measuring device as well as the support 9 is mounted.

A frame 4 of a measuring device is erected on the base-plate 20 and fixed to it, being arranged adjacent to the clamping device. The frame 4 is parallelepipedic and has a front surface 21 facing the plane of the clamping device which, simultaneously, forms a slide surface for the clamping device. The frame has a measuring gap 22 into which the point of a saw tooth to be gauged is inserted and in which two measuring pins 3a and 3b can be moved forward into contact with the side edges of the saw tooth. In the embodiment shown the measuring pins slide in vertical guides and their movement can be transmitted, via studs 23a and 23b projecting out through side tracks, to S-shaped link-arms 5a and 5b which in turn show the position of the measuring pins in relation to the respective side surfaces of the saw-blade, by means of indicators 6a and 6b and reading means 7a and 7b, respectively.

Connection of the indicators to the link arms 5 can be seen in greater detail from FIGS. 1, 2 and 3. The indicators are mounted on a shaft 25 in the frame 4 and connected to the link arms 5 by springs 26, 27. The mounting point is close to one end of each indicator arm so that there is a short portion and a long portion of the indicator and movement imparted to the shorter section is transmitted thereby to the end of the long section. The shorter section of the indicator 6a is thereby connected to the mounting shaft 28 of the link arm 5a, said shaft being located at the lower knee of the link arm 5a, while the upper, longer section of the indicator 6b is connected by a spring 27 to the mounting shaft 29 of the link arm, said shaft being located at the upper knee of the link arm. The non-mounted ends of the link arms are provided with link-rollers 30 which guide shoulders 31 on the upper, longer section of indicator 6a and the lower, shorter section 6b. In FIGS. 2 and 3, the frame that has just been described has been removed to show the position of the link arms more clearly and is indicated only by broken lines while the frame 4b of the nearest measuring device has been shown.

The measuring device according to the invention is thus constructed so compactly in lateral direction that it requires no more space in the longitudinal direction of the saw-blade than that occupied by a tooth-pitch. As can be seen from FIG. 5, the saw-blade is inserted so far into the measuring gap 22 that the cylindrical bar 10c of the clamping device is in contact with the saw-blade in a gullet.

In order to be able to carry out measurements on all the teeth of a saw simultaneously, a large number of measuring means are combined to form a measuring apparatus on a support 20. This can be seen more clearly from FIG. 4, where a number of measuring means corresponding to the number of teeth on the saw-blade to be measured, are shown combined on the support 20 so that each one of the teeth is located between the pins 3a and 3b of the measuring device in question. The bar member 13 has a length substantially corresponding to the length of the saw-blade and can thus separate the measuring pins on all the devices.

The appearance of a measuring apparatus is also further illustrated in FIG. 4, the apparatus consisting of a plurality of measuring devices according to the invention. Four clamping devices 10 and thirteen measuring devices 3, 4 are shown in the figure. Some indicators 6a, 6b according to the invention are shown in a frame casing 36, that has been cut away. The scales of the measuring apparatus can be seen at the top of the casing through a window 37, the pair of scales for every tooth being alternately light and dark in order to facilitate the reading.

The arrangement operates in the following manner: The saw-blade is inserted in such a way that a tooth tip is exactly in the gap 22 of the measuring device. The operating lever 14 is then located in its position 14b (FIG. 4), the clamping shaft 15 having been turned in the direction of the arrow 15a and, via a back stop 11 securely attached to it, actuated a back stop 12 on a measuring operation shaft 16 which has thus been turned in the direction of the arrow 16a and has thereby rotated a bar member 13 into abutment with the ends 5aa and 5bb on the link arms 5a and 5b in such a way that the said arms have been rotated around their mounting shafts 28 and 29, respectively, against the actions of the springs 26 and 27, respectively and has thereby separated the two measuring pins 3a and 3b via the studs 23a and 23b, respectively. The saw tooth in question can thus be inserted between the pins 3a and 3b.

After the saw has been inserted in position, the operating arm 14 is moved from the position 14b (FIG. 4) across to its position 14a.

The saw is thereby clamped by means of a plurality of clamping devices 10 arranged along the shaft 15, four of which devices are shown in FIG. 4.

When the clamping shaft is rotated in the direction opposite to the arrow 15a the back stop 11 is moved out of engagement with the back stop 12 on the measuring operation shaft 16 which is rotated in the opposite direction to the arrow 16a either by the weight of the bar member 13 or by means of a specially arranged spring. The link arms 5a and 5b on the various measuring devices are thereby released and swing to the action of springs 26, 27, the measuring pins 3a and 3b in the various measuring devices are moved together into contact with the upset side edges of the various saw tooth points. The indicators 6a and 6b accompany the movement of the respective link arms 5a and 5b and therefore also the movement of the measuring pins 3a and 3b, respectively. As the indicators 6a and 6b are mounted close to their lower ends an enlarged deviation angle is obtained on the reading scales 7a and 7b. The scale 7a is calibrated in such a way that its reference position corresponds to a position of the measuring pin 3a' when its upper measuring surface coincides with the measuring plane or with the bottom of the saw-blade. The deviation that is read at the point of the indicator 6a thus constitutes a measure of how much the bottom side edge of the point of the swage set tooth projects beyond the bottom surface of the saw-blades. In a corresponding manner, a reading is obtained on the reading scale 7b at the point of indicator 6b corresponding to the distance that the upper side edge of the tooth point projects beyond the upper surface of the saw-blade.

Owing to the fact that the support and the scale 7a for the indicator 6a can be completely joined together, as is also the case in the embodiment shown in FIG. 1, exact calibration of the reference-point on the scale can be obtained. Returning to the other scale, the reference-point must correspond to a measuring plane coinciding with the upper surface of the saw-blade. For various reasons, e.g. with saw-blades having different blade thicknesses, gauges, saw-blades which have been altered by wear and tear and elongation of the saw-blade during operation, this measuring plane is not always the same.

It is therefore necessary to make the reference-position of scale 7b dependent on the position of the clamping head 10a. As can be seen from FIGS. 1, 2 and 3, this is carried out in the embodiment shown in such a way that a plate 32 on the clamp head extends someway past the front surface 21 of the frame 4a and is there provided with a stud 17 at right angles to the plate 32, said stud coming into engagement close to the clamp head with a projection 33 on a link arm 34 the lower end of which is connected to the short end of a long lever 18 mounted around the shaft 25, the long end of the lever 18 supporting a carrier arm 35 for a number of movable scales 7b. In this way it is ensured that the reference-position on the scales 7b always exactly correspond to the upper plane of the saw-blade and a reading can be taken which directly indicates the distance that the upper tooth point projects beyond the upper side of the saw-blade, the set.

Although the invention has been described in connection with one embodiment, it can be varied at random within the scope of the following claims.

What I claim is:

1. A measuring device for saw-blades for gauging the distance that the side edge of a tooth point projects beyond the side of the saw-blade, comprising support means for the saw-blade forming a geometrical measuring plane, movable clamping means adapted to clamp the saw-blade in a fixed position on said support means, measuring means mounted on said support means comprising a pair of movable opposed sensing members adapted to be moved into and out of engagement with opposite sides of a saw-blade tooth to sense the location of said saw-blade tooth, scale means mounted on said support means and movable with said clamping means to position said scale means in accordance with the thickness of the saw-blade and indicating means connected to said sensing means and movable relative to said scale means to indicate the above-mentioned distance.

2. A measuring device as set forth in claim 1 wherein said measuring means comprises a plurality of pairs of said opposed sensing members corresponding in number to the number of teeth of said saw-blade to be measured.

3. A measuring device as set forth in claim 1 wherein said measuring means comprises a measuring frame having a notch in one edge thereof adapted to receive a saw-blade tooth therein and said sensing members are constituted by a pair of elongated pin members guided in said frame for longitudinal axial movement into and out of said notch in opposed relation to a tooth disposed in said notch.

4. A measuring device as set forth in claim 1 wherein said scale means comprises a first scale member fixedly secured to said support means and a second scale member movable relative to said first scale member, lever means connected to said second scale member and said clamping means whereby movement of said clamping means into clamping relation with a saw-blade causes corresponding movement of said second scale member relative to said first scale member.

5. A measuring device as set forth in claim 4 wherein said indicating means comprises a first indicator movable relative to said first scale member and connected to the sensing member adapted to contact the side of the saw-blade tooth adjacent said support means and a second indicator movable relative to said second scale member and connected to a sensing member adapted to contact the side of the saw-blade tooth adjacent said clamping means.

6. A measuring device as set forth in claim 3 further comprising link means interconnecting said pins and said indicating means whereby movement of said pins causes corresponding movement of said indicating means relative to said scale means.

7. A measuring device as set forth in claim 6 further comprising shifting means adapted to be moved into and out of engagement with said linking means to cause movement of said pins away from each other to a position whereby a saw-blade tooth may be placed in said notch.

8. A measuring device as set forth in claim 7 further comprising spring means connected to said linking means and said frame to shift said pins toward each other into engagement with a saw-blade tooth when said shifting means is out of engagement with said linking means.

9. A measuring device as set forth in claim 8 further comprising a first shaft mounted for rotation in said support means, an operating lever secured to said first shaft, eccentric means connected to said first shaft, resilient connecting means on said clamping means and operatively connected to said eccentric means whereby rotation of said first shaft causes movement of said clamping means into and out of clamping engagement with a saw blade on said support means.

10. A measuring device as set forth in claim 9 further comprising a second shaft mounted for rotation parallel to said first shaft, means connecting said shifting means to said second shaft, a first strike member mounted on said first shaft and a second strike member mounted on said second shaft in operative relation to said first strike member whereby upon movement of said operating lever in one direction said clamping means is moved into engagement with a saw-blade on said support means and said first strike member contacts said second strike member to rotate said second shaft and move said shifting means out of engagement with said linking means to enable said pins to move into contact with the saw-blade tooth under the action of said spring means.

References Cited by the Examiner

UNITED STATES PATENTS

| | | | |
|---|---|---|---|
| 1,044,784 | 11/1912 | Hibbert | 33—202 |
| 1,064,732 | 6/1913 | Hiler | 76—47 |
| 1,475,351 | 11/1923 | Phillips | 76—47 X |
| 1,497,580 | 6/1924 | Mullenax | 33—202 X |

LEONARD FORMAN, *Primary Examiner.*

W. I. MARTIN, *Assistant Examiner.*